United States Patent
Kanaya et al.

(10) Patent No.: US 7,813,220 B2
(45) Date of Patent: Oct. 12, 2010

(54) METHOD AND APPARATUS FOR LONG TERM SEISMIC MONITORING

(75) Inventors: Yasuo Kanaya, Tokyo (JP); Emmanuel Coste, Tokyo (JP); Colin Wilson, Kanagawa-Ken (JP); Rachel Agnes Lavaure, Tokyo (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 423 days.

(21) Appl. No.: 11/949,760

(22) Filed: Dec. 3, 2007

(65) Prior Publication Data

US 2008/0128127 A1    Jun. 5, 2008

Related U.S. Application Data

(60) Provisional application No. 60/868,357, filed on Dec. 4, 2006.

(51) Int. Cl.
*G01V 1/38* (2006.01)
*E21B 47/01* (2006.01)

(52) U.S. Cl. ............... 367/35; 367/25; 181/102; 181/105; 166/250.11

(58) Field of Classification Search ............ 367/25, 367/35; 181/102, 105, 108; 175/45; 166/250.01, 166/250.11
See application file for complete search history.

(56) References Cited

U.S. PATENT DOCUMENTS

| | | | |
|---|---|---|---|
| 3,791,479 A | | 2/1974 | Lebreton et al. |
| 5,022,484 A | * | 6/1991 | Panetta et al. ............... 181/105 |
| 5,200,581 A | | 4/1993 | Boyle et al. |
| 5,318,129 A | * | 6/1994 | Wittrisch ..................... 367/86 |
| 5,801,642 A | | 9/1998 | Meynier |
| 5,808,191 A | * | 9/1998 | Alexy et al. .................. 175/45 |
| 6,173,804 B1 | | 1/2001 | Meynier |
| 6,315,075 B1 | * | 11/2001 | Nakajima ..................... 367/35 |
| 2001/0030076 A1 | | 10/2001 | Paulsson |

* cited by examiner

*Primary Examiner*—Ian J Lobo
(74) *Attorney, Agent, or Firm*—Daryl Wright; Jody DeStefanis; Jeff Griffin (57) ABSTRACT

A method and apparatus for deploying seismic detectors and monitoring seismic activity associated with a production well from a down hole location within a well.

22 Claims, 8 Drawing Sheets

METHOD AND APPARATUS FOR LONG TERM SEISMIC MONITORING

CROSS-REFERENCE TO RELATED APPLICATION

This application relates to and claims the benefit under 35 U.S.C. §119(e) of applicants' U.S. Provisional Application Ser. No. 60/868,357 entitled "Method and Apparatus for Deploying Seismic Detectors," filed Dec. 4, 2006. The benefit of this priority date is claimed and the disclosure of this Provisional Application is hereby incorporated by reference as though set forth at length.

TECHNICAL FIELD

This invention relates to a method and apparatus for deploying seismic detectors and monitoring seismic activity from a downhole location in a well. More specifically, this invention relates to deploying and monitoring with a permanent monitoring tool which is deployed on tubing to be run into a deep cased well hole for an extended period of time. For example, the well may be a production well, or may be adjacent a production well, to monitor seismic and/or micro-seismic events in or near the production well over the operating life of the production well.

BACKGROUND OF THE INVENTION

In the oil and gas industry acoustic tools are used to provide operationally significant information about seismic events occurring during production of a well. Borehole seismic data can be utilized to determine subsurface stratigraphy and refine surface seismic data. Micro-seismic data may be generated by formation fracturing—induced or natural. Worthwhile seismic data can be gathered on a continuing or recurrent basis to monitor subsurface formations and reservoirs during production operations of a well. In this, the gathering of data on a continuous basis from a downhole location assists in optimizing extraction of gas or oil deposits from a producing well.

In the past, downhole seismic data has been acquired by a number of different techniques. Sensors have been mechanically coupled outside of casing and cemented in place. In other instances, sensors have been coupled to production tubing, inside a well casing, or in association with production packers. In devices of the internal kind deployment is an issue and maintaining an operative sensor that does not interfere with normal production activity can be a challenge.

Another seismic system that has been used is a wireline tool which is connected to a signal wire from a surface location and is lowered into a cased hole to measure/monitor seismic and micro-seismic events. A wireline tool is normally used to monitor signals for a short period of time such as a few days or a few weeks.

Another seismic monitoring system involves drilling a monitoring well that is substantially parallel with a production well and seismic or micro-seismic events can be monitored from this separate monitoring well. In this environment a seismic tool can be a permanent device which is deployed on tubing and then run into a deep cased hole to monitor subsurface formations and reservoirs during the production life of the adjacent well. A permanent seismic device is normally used to monitor signals for a longer period of time such as a few weeks to ten years or more. The gathering of seismic data on a continuous basis assists in optimizing extraction of gas or oil deposits.

In the past, permanent seismic tools have been lowered into monitoring wells drilled adjacent to a production well on tubing that carries the seismic tool. In this system the seismic tool was biased against a surrounding casing by one or more bow springs. The weight of tubing over long distances, however, such as four thousand meters or more, in a deviated or even slightly sloping hole can counteract the normal operative force provided by a bow spring arrangement and compromise solid coupling contact between a seismic sensor and the wall of a surrounding casing.

In at least one other previously known design a seismic tool has been designed to be mounted on the periphery of a mandrel, or short length of tubing, and lowered into a borehole casing. At a desired depth the seismic tool is actuated to extend laterally and into solid contact with a casing side wall. Some of these tools are designed to provide azimuthal orientation before being locked in place. Upon further activation the tool is designed to be released from contact with the casing wall so that the seismic tool can be retrieved. Seismic tools of this design, although theoretically appealing, are somewhat complicated in design detail and are subject to failure during operation over long periods of time, particularly during release operations. Moreover, tools of this design are more expensive than previously known bow spring based designs.

Although permanent or semi-permanent seismic sensors have been known in the past, a need exists for an enhanced reliable, rugged and cost effective way of placing and maintaining a seismic tool in a downhole monitoring location for recording seismic and micro-seismic events in a nearby production well geologic zone throughout the operating life of the production well.

SUMMARY OF THE INVENTION

The methods and apparatus of the subject invention include in one embodiment a tubing system that is operable to be bowed during placement into a well casing. A first eccentric bearing member is mounted upon a tubing to be run into a bore hole, cased or open hole. A second eccentric bearing member is also mounted on the tubing in an axially spaced relationship with respect to the first eccentric member and the two eccentric bearing members may have the same azimuthal orientation. A seismic tool is then mounted on a third eccentric bearing member that is mounted on the tubing intermediate the first and second eccentric bearing members at an azimuthal orientation rotated 180 degrees with respect to the first and second eccentric members. The uniform radial extent of the first and second eccentric members coupled with the radial extent of the third eccentric member is greater than the inner diameter of a surrounding wall such that the tubing on either side of the third eccentric member is bent and operatively serves to force the seismic tool carried by the third eccentric member into abutting contact with the side wall surrounding the seismic tool.

The subject invention contemplates that the monitoring well may be a production well itself, or an adjacent well that is drilled for purposes of monitoring seismic activity adjacent the production well. The seismic signals may be originated from one or more of the production well, an injector well, a surface source such as used in conventional VSP surveys, or other means that are known in the art. Furthermore, the techniques disclosed herein may be utilized for purposes of detecting seismic activity with respect to an underground reservoir such as, for example, a reservoir for storing water or gas.

THE DRAWINGS

Other aspects and advantages of the present invention will become apparent from the following detailed description of embodiments taken in conjunction with the accompanying drawings wherein.

DETAILED DESCRIPTION

Turning now to the drawings, wherein like numerals indicate like parts, the subject invention is directed to the concept of a method and apparatus of deploying and maintaining signal detectors within a well bore for purposes of monitoring seismic activity with respect to the surrounding geologic formations.

Figure 1:
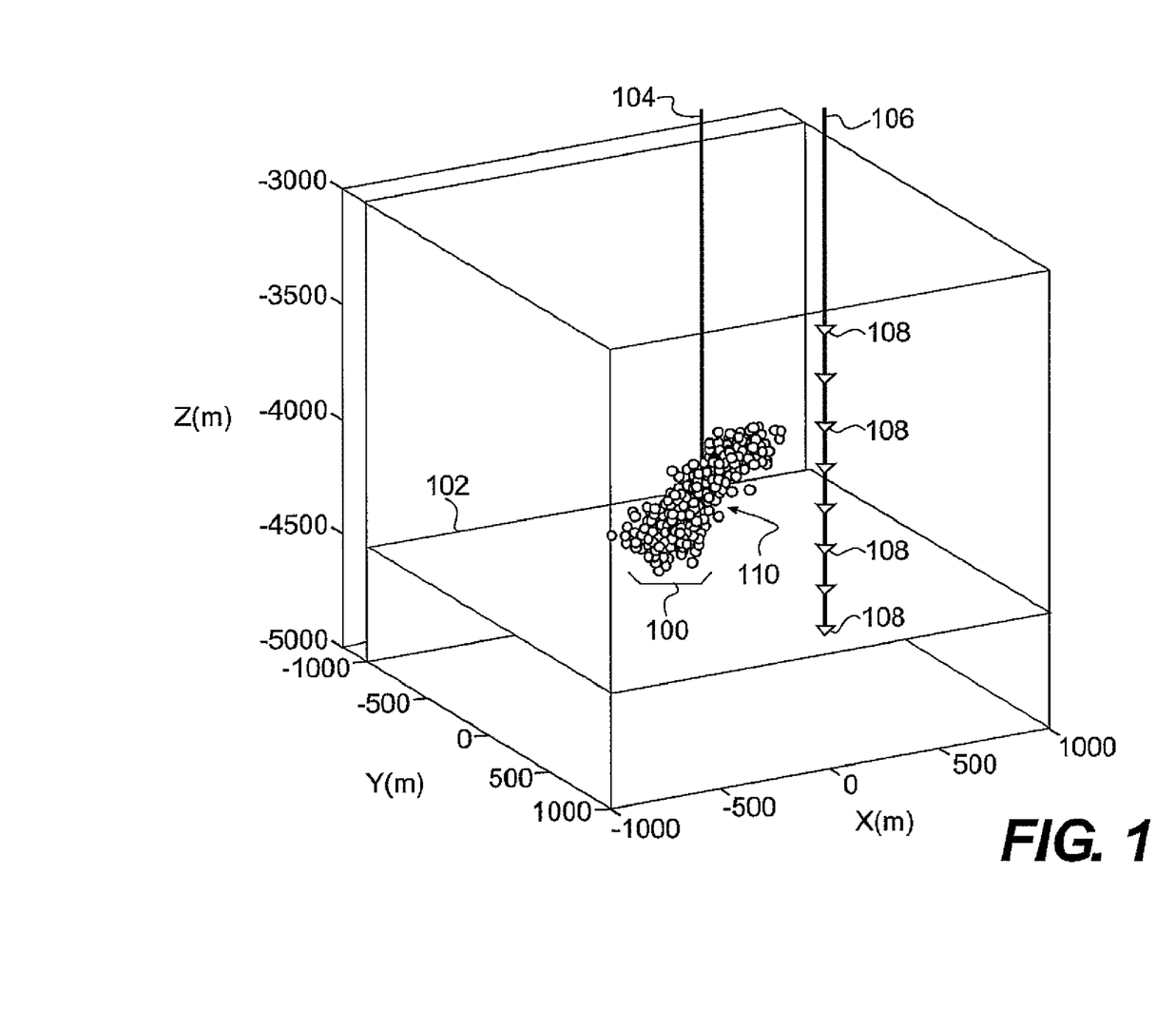
FIG. 1 is a schematic of a typical production well and a substantially parallel monitoring well that has been drilled into an earth formation to monitor seismic and micro-seismic events, represented by small spheres in the Figure, during the production life of the production well.

FIG. 1 discloses a three dimensional view of a production zone 100 of a hydrocarbon formation. This particular example shows production at approximately a depth of 4500 meters represented by a horizontal plane 102. A production well 104 has been drilled into the hydrocarbon zone and a monitoring well 106 has also been drilled down to the production level of 4500 meters. The top of the monitoring well may be 20 or so meters from the site of the production well and bottom may extend slightly outward to 500 meters or so but in essence the two well bores are parallel. Like the production well, the monitoring well is provided with casing (not shown in this view) and a series of seismic monitoring sensors 108 are positioned within the monitoring well casing to monitor seismic and micro-seismic events associated with production activity of the formation. These seismic events are represented in this figure by small balloons 110. Monitoring seismic activity of the producing well from adjacent downhole strata throughout the operating life of the production well can provide useful data to assist in optimizing extraction of the oil and/or gas deposit. Although FIG. 1 depicts one possible operational context for the present invention, it is contemplated that the techniques disclosed herein are not limited to the depicted arrangement. Rather, the disclosed methods and apparatus may be utilized in various operational contexts that require the deployment of signal detectors in a cased or open hole well for purposes of monitoring seismic activity in the formations that surround the well including, but not limited to, deployment in a production well, a monitoring well associated with a production well, or in a stand-alone well for purposes of monitoring seismic activity with respect to a reservoir or other structures of interest in the surrounding formations.

Figure 2:
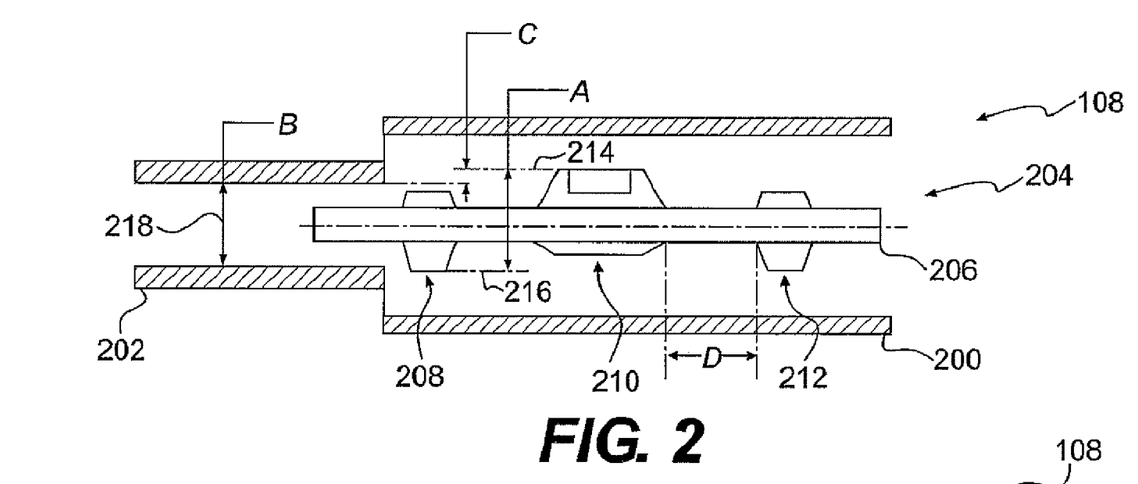
FIG. 2 is a schematic illustration of a well casing of a first size and a smaller well casing that extends down to a production level and a first eccentric bearing member, an eccentric seismic sensing tool and a second eccentric bearing member being deployed with an interference fit into the smaller well casing.

Turning now to FIG. 2, a schematic view of a segment of a well 108, such as a monitoring well, is shown. The monitoring well 108 is provided with a casing, as noted above. The casing can be formed by a series of sections decreasing in diameter as the hole increases in depth, or in two or more sections such, for example, an upper casing section 200 having an internal diameter of approximately 9 and ⅝ inches and then a second section 202 having an interior diameter of approximately 7 inches.

Figure 3:
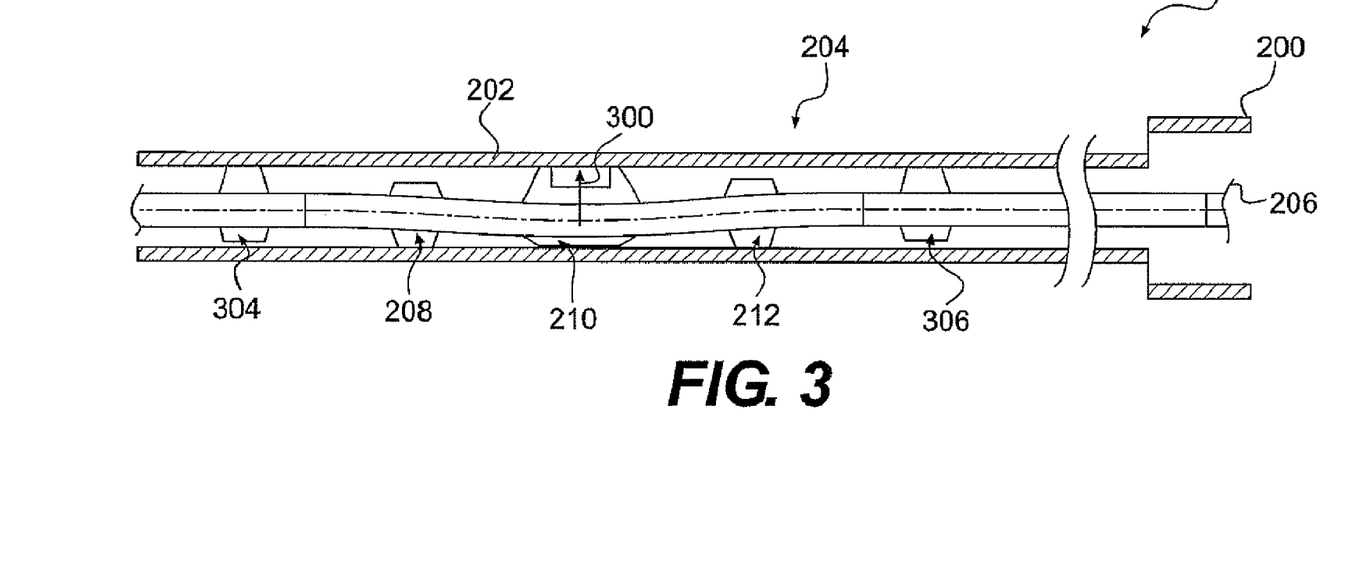
FIG. 3 is another schematic illustration of the eccentric seismic sensing system depicted in FIG. 2 positioned within a well casing and in addition the provision of first and second eccentric centering members operable to re-center the deployment tubing.

FIG. 2 also depicts, in a schematic format, the core elements of an eccentric seismic sensing system 204. In this, tubing 206 extends from a surface location and carries a first eccentric bearing member 208, a central eccentric seismic member 210 and a second eccentric bearing member 212, as discussed above. In a relaxed position, such as illustrated in FIG. 2, the eccentric seismic member 210 and the two adjacent but longitudinally spaced eccentric bearing members have an outer dimension "A" which is greater than an internal diameter dimension "B" of the lowermost segment of the monitoring well casing 202. Accordingly when the eccentric seismic sensing system 204 is pushed into the final section of casing 202 the deploying tubing 206 must bend to accommodate a diametrical interference fit of the dimension "C." This bending creates a lateral force 300 biasing the eccentric seismic sensing member 210 into firm abutting engagement with the internal side wall of the monitoring well casing 202, as illustrated in FIG. 3. In order to bring the tubing 206 back into a substantially concentric posture within the casing 202 the seismic sensing system 204 further can include a first 304 and a second 306 eccentric centralizing member mounted upon the tubing 206 to redirect the tubing into a concentric posture within the casing 202.

Figure 4A:
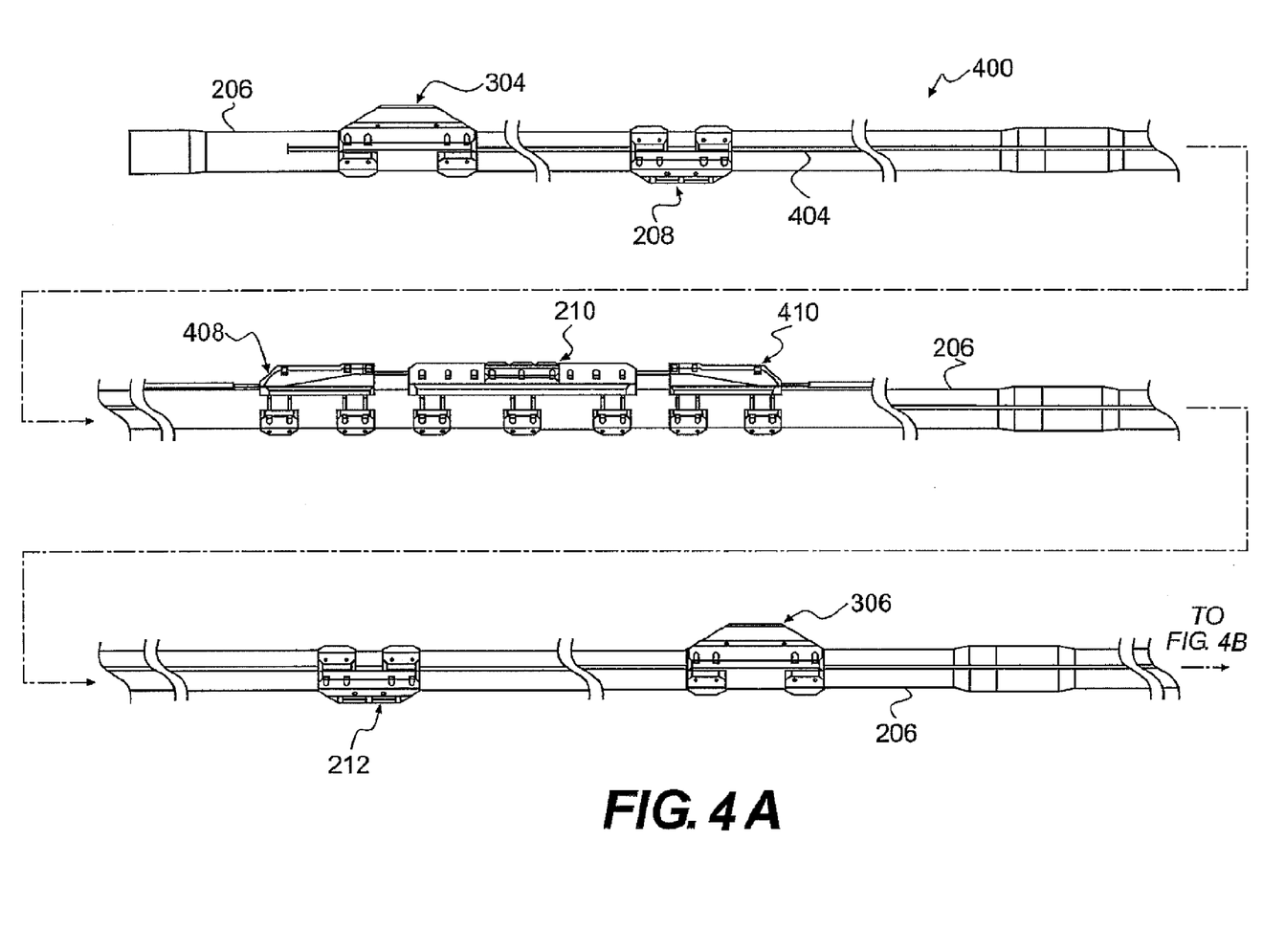
FIG. 4A is a section of continuous tubing, broken into sections to fit onto a sheet of drawing, to be positioned within a borehole that includes eccentric bearing members, intermediate eccentric seismic members and optional eccentric re-centering members.
Figure 4B:
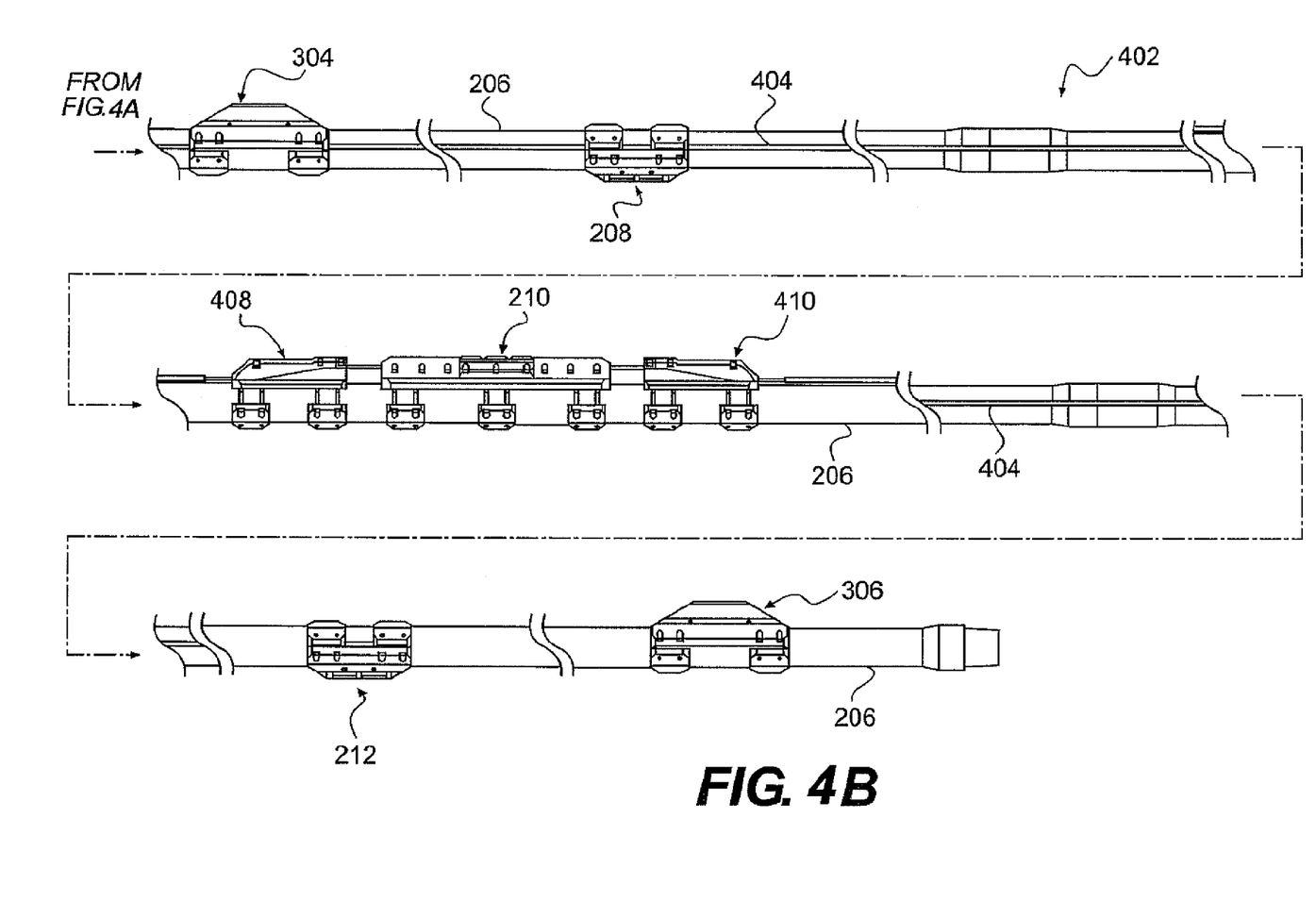
FIG. 4B is a continuation of FIG. 4A and discloses an additional series of eccentric assemblies similar to those depicted in FIG. 4A.

FIGS. 4A and 4B disclose a continuous illustration of a more detailed showing of a first seismic assembly 400 in FIG. 4A and a second seismic assembly 402 in FIG. 4B. Turning first to FIG. 4A, a tubing 206 is shown as discussed above in connection with FIGS. 2 and 3. A first eccentric bearing member 208 is shown mounted upon the tubing 206 followed by an eccentric seismic member 210 and a second eccentric bearing member 212. A first eccentric centralizing member 304 is mounted on the tubing 206 at one end of the assembly 400 down stream of the eccentric bearing member 208 and a second eccentric centralizing member 306 is mounted on the tubing 206 upstream of the eccentric bearing member 212. A control line 404 extends along the tubing 206 and a first control line protection shoe 408 is shown positioned on the tubing 206 downstream of the eccentric seismic member 210 and a second control line protection shoe 410 is mounted on the tubing 206 upstream of the eccentric seismic member.

FIG. 4B is a continuation of FIG. 4A and discloses a second seismic assembly 402 which is a duplicate of the first seismic assembly 400 shown in FIG. 4A. The tubing 206 extends throughout the Figure and a first eccentric bearing member 208 is shown mounted on the tubing. A central eccentric seismic member 210 is shown with the control line 404 extending through the seismic member. The control line is protected at each end of the eccentric seismic member 210 by the provision of a first 408 and second 410 control line protective shoe. A second eccentric bearing member 212 is mounted upstream of the eccentric seismic member 210 and first 304 and second 306 eccentric centralizing members are mounted upon the tubing downstream and upstream of the first and second eccentric bearing members, respectively.

Referring now to FIGS. 5 and 6A-6C there will be seen detailed views of the eccentric seismic member 210 in accordance with one embodiment of the invention. As noted above, the seismic member 210 is mounted upon the deployment tubing 206. In this a first saddle portion 600, note particularly FIG. 6B, may be a continuous generally C-shaped, pillow block or saddle or a plurality of individual saddle portions 602, 604 and 606. These saddle elements are mounted upon an exterior surface of the tubing 206, note particularly, cross-sectional FIG. 6C, and are opposed by a second generally C-shaped, pillow block, or saddle portion 608. The two opposing saddle portions 600 and 608 are clamped onto the tubing 206 by machine bolts 610, or other conventional retaining assemblies.

Figure 5:
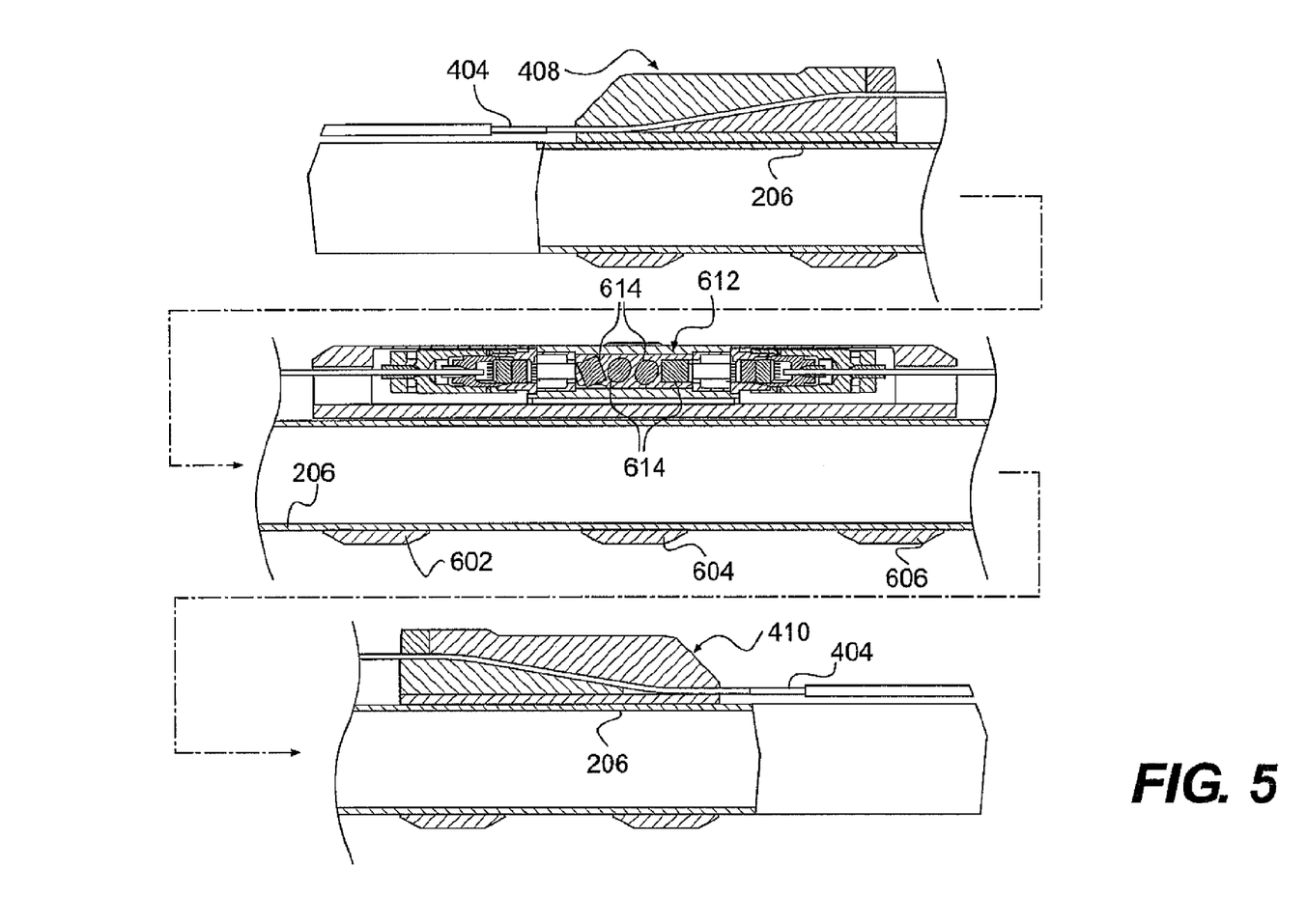
FIG. 5 is a sectional detail view of an eccentric seismic member as depicted in FIGS. 4A-B.
Figure 6A:
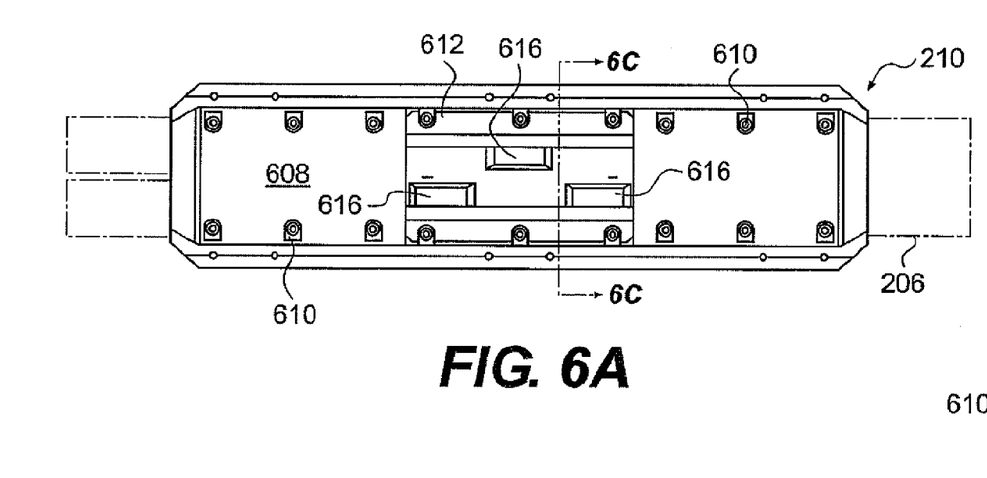
FIG. 6A is a top view of an eccentric seismic member such as shown in FIG. 5.
Figure 6B:
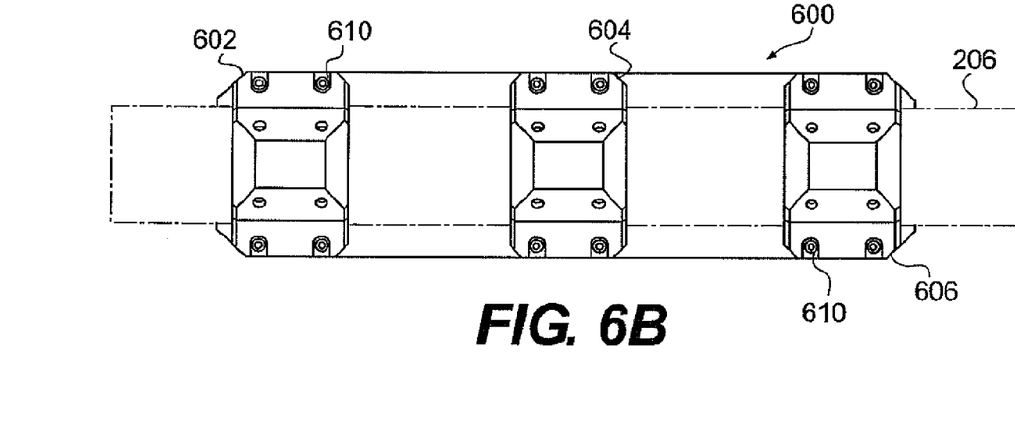
FIG. 6B is a bottom view of the eccentric seismic member depicted in FIG. 5.
Figure 6C:
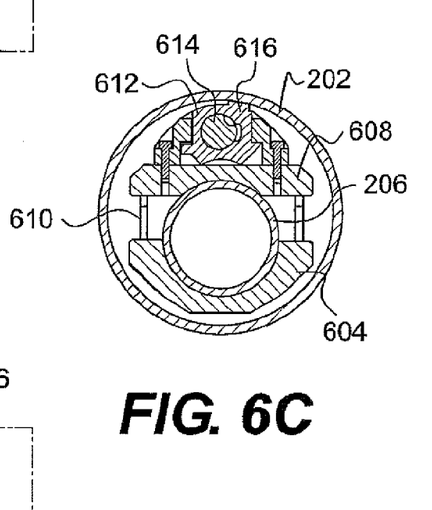
FIG. 6C is a cross-sectional view of the eccentric seismic member taken along section line 6C-6C in FIG. 6A.

Mounted on the second saddle portion 608 is an eccentric seismic sensing member 612. The seismic sensing unit, per se, can be one or more of a geophone or an accelerometer. For example, the seismic sensing unit may have a plurality of sensing units 614 positioned at varying angles to pick up multiple component seismic data in three dimensional space. In this, four tetrahedrally oriented geophones or accelerometers can be used, as shown in FIG. 5, for determination of both the type of wave and its direction of propagation. In one possible embodiment, an exterior surface of the seismic sensing member is fashioned with three contact pads 616 which serve to make firm abutting engagement with an interior surface of the surrounding wall surface—note FIG. 6C. The seismic unit depicted in FIG. 6A does not extend throughout the length of the second saddle portion, however, other seismic units may be longer and extend throughout the length of the saddle member such as shown in FIG. 5. Finally, as noted above the control line 404 is protected as it passes through the eccentric seismic member by passing through shoes 408 and 410, as illustrated in FIG. 5.

Figure 7A:
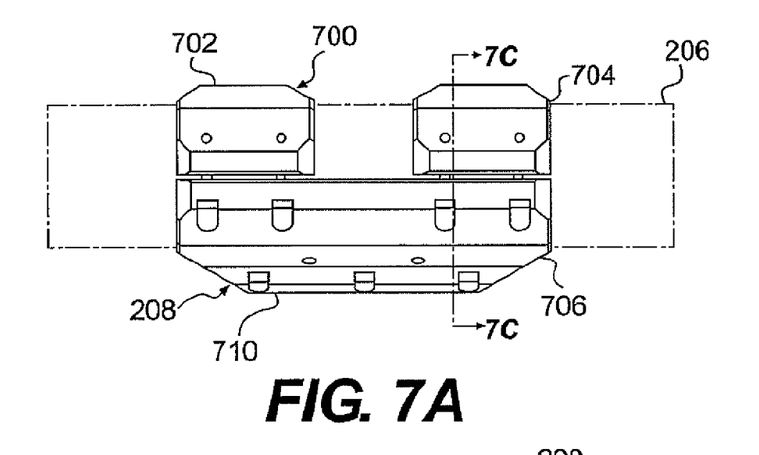
FIG. 7A is a side view of an eccentric bearing member depicted in FIGS. 4A-4B.
Figure 7B:
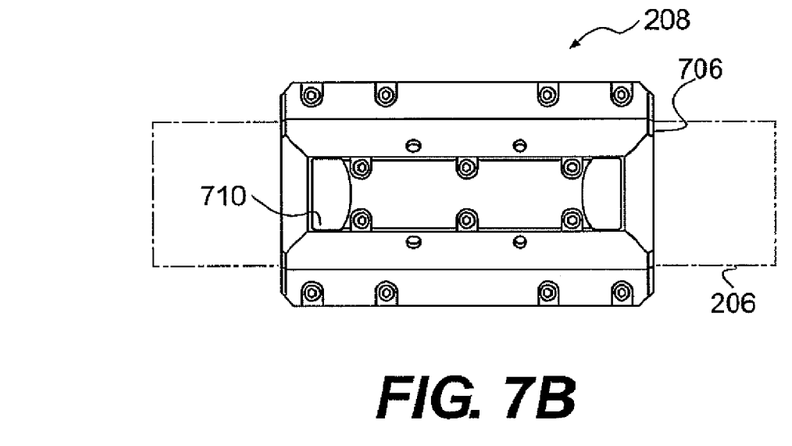
FIG. 7B is a bottom view of the eccentric bearing member shown in FIG. 7A.
Figure 7C:
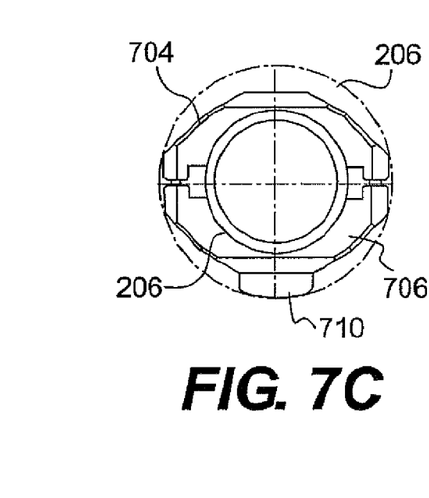
FIG. 7C is a cross-sectional view of the eccentric bearing member taken along section line 7C-7C in FIG. 7A.

FIGS. 7A-7C illustrate detailed views of an eccentric bearing member 208 mounted upon the tubing 206. The eccentric bearing member has a first C-shaped, pillow block, or saddle portion 700 which may be separate units 702 and 704 or a continuous member. A second C-shaped member or saddle portion 706 is shown in an opposing posture and is mounted about the tubing 206. Machine bolts or other fastening assemblies are used to securely clamp the first and second saddle portions upon the tubing 206. The eccentric bearing member 208 carries an eccentric bearing portion 710 which is secured onto an outer surface of said second C-shaped or saddle portion 706—note particularly FIG. 7C. The outer eccentric bearing portion may be formed from a high strength, martinsitic, stainless steel to accommodate abrasion as the seismic sensing system is pushed or guided into position within a surrounding well casing. Alternatively, if a degree of cushioning or sound deadening is desired the eccentric bearing portion may be fashioned from a polymeric composition with embedded metal particles or even just a high strength polymer provided that the polymer has enhanced wear characteristics.

Figure 8A:
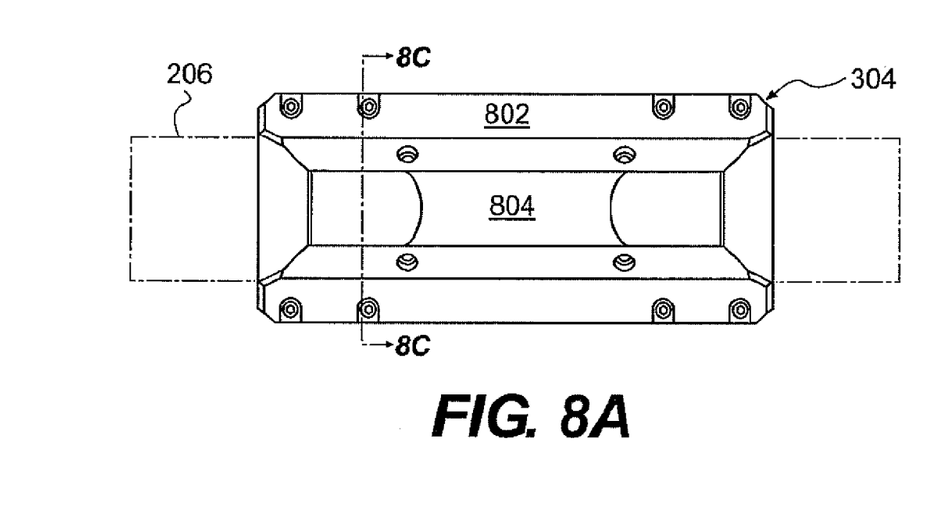
FIG. 8A is a top view of an eccentric centering member as shown in FIGS. 4A-4B.
Figure 8B:
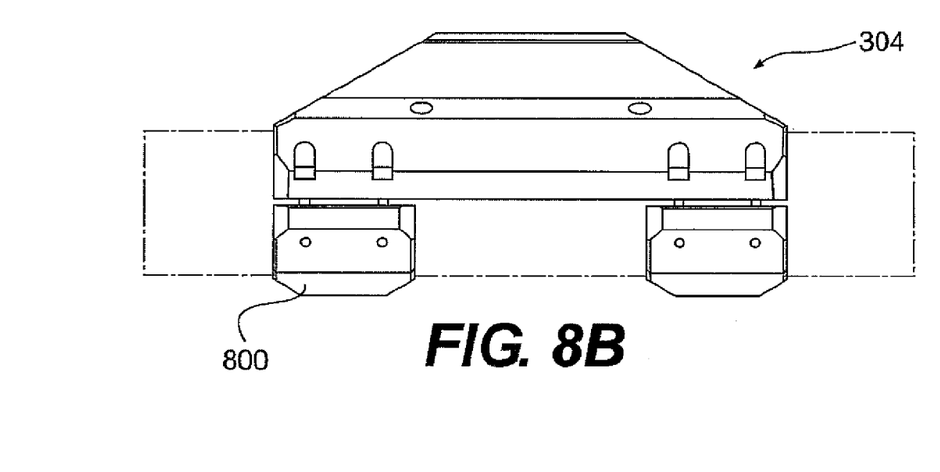
FIG. 8B is a bottom view of the eccentric centering member shown in FIG. 8A.
Figure 8C:
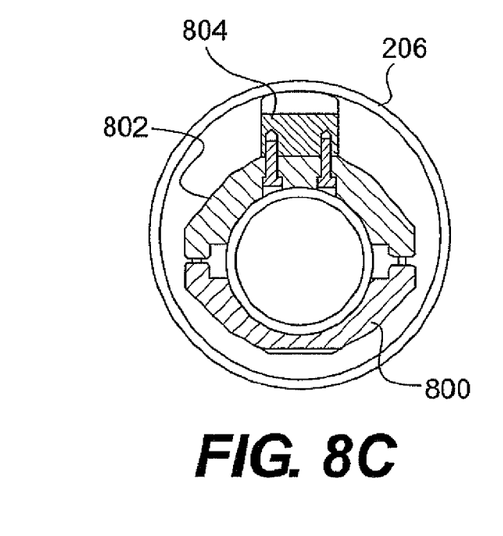
FIG. 8C is a cross-sectional view taken along section line 8C-8C in FIG. 8A.

Referring to FIGS. 8A-8C details of an eccentric centralizing member 304 or 306, which are identical, are shown. In a manner similar to the eccentric bearing member 208 the centralizing member is fashioned with a first 800 generally C-shaped, pillow block, or saddle portion and an opposing second C-shaped, pillow block, or saddle portion 802. The opposing first and second saddle portions 800 and 802 are clamped around the tubing 206 by machine bolts or the like in a secure orientation that is diametrically opposed to the orientation of the first and second eccentric bearing members 208 and 212. An eccentric bearing member 804 is mounted on an exterior surface of the second saddle portion 802 and serves to firmly engage an interior wall surface of the surrounding monitoring well casing 202. The eccentric bearing member is preferably composed of a polymer which may have embedded metal particles and serves a cushioning or sound deadening function along with the centralizing function discussed above.

In operation a set of, for example, four seismic sensing assemblies 108 are mounted upon the tubing 206 and deployed into the interior of the well. Although FIG. 1 discloses eight seismic sensing assemblies this represents two sets with four assemblies 108 in each set. In FIGS. 4A-4B, two assemblies 108 are shown which, are labeled for convenience in FIGS. 4A and 4B, 400 and 402 respectively, represent half of a full operating set of four, however, two were disclosed for ease of illustration. Although only eight sensing assemblies 108 are disclosed in FIG. 1 the number of assemblies is not limited.

In a typical operating environments, the tubing 206 ranges in outside diameter of 2⅞ inches with a thickness of 0.19 inches to 0.336 inches to an outside diameter of 4½ inches and a tubular thickness from 0.271 inches to 0.630 inches. The operating normal force 300 on the eccentric seismic member ranges from approximately 20 to approximately 130 kilograms of force. A preferred range of force 300 is between approximately 70 and 80 kilograms. The amount of deflection of the tubing ranges from approximately 4 to approximately 8 millimeters with a preferred range for a tubing of 2⅞ inches being approximately 4.5 to approximately 5.0 millimeters. For a tubing of approximately 4½ inches in diameter a deflection of approximately eight millimeters is preferred. In addition, the distance "D" between an edge of an eccentric seismic member 210 and an adjacent eccentric bearing member 212 is between approximately 250 centimeters and approximately 300 centimeters.

Although the above description is with reference to a continuous deployment tubing 206 another aspect of the invention is the provision of a separate mandrel segment that is machined specifically to accommodate the eccentrically mounted seismic sensing member, clamped onto the mandrel or to an extent integral with it that is then either longitudinally screwed into or welded onto the tubing 206

The various aspects of the invention were chosen and described in order to best explain principles of the invention and its practical applications. The preceding description is intended to enable those of skill in the art to best utilize the invention in various embodiments and aspects and with modifications as are suited to the particular use contemplated. It is intended that the scope of the invention be defined by the following claims.

What is claimed is:

1. A seismic sensing system for monitoring seismic activity associated with a formation from a downhole location, said monitoring well seismic sensing system comprising:
   a tubular member having a central longitudinal axis and being operable to be inserted into a well; and
   at least one seismic sensing assembly mounted upon said tubular member, said at least one seismic sensing assembly including;
      first and second eccentric bearing members coupled to said tubular member, said first and second eccentric bearing members having;
         an eccentric bearing portion having a first exterior bearing surface operable to abut against an interior surface of the well, wherein a first bearing radial distance from the central longitudinal axis of said tubular member to a maximum eccentric point on the first exterior bearing surface is greater than a second bearing radial distance diametrically opposed to said first bearing radial distance and extending from the central longitudinal axis of said tubular member to a second exterior bearing surface;
      an eccentric seismic member connected to said tubular member in a position between and rotated one hundred and eighty degrees out of phase with said first and second eccentric bearing members, said eccentric seismic member having;
         an eccentric seismic sensing member coupled to an exterior portion of said eccentric seismic member and operable to abut against an interior surface of the well, wherein a first seismic radial distance from the central longitudinal axis of said tubular member to a maximum eccentric point on an eccentric seismic contact surface of said eccentric seismic sensing member is greater than a second seismic radial distance diametrically opposed to said first seismic radial distance and extending from the central longitudinal axis of the tubular member to an exterior seismic surface of eccentric seismic member and wherein the first bearing radial distance plus the first seismic radial distance is greater than the interior diameter of the surrounding well such that an opposing interference fit will exist to acoustically couple the eccentric seismic sensing member within the well and against an interior wall surface of the well.

2. A seismic sensing system as defined in claim 1 wherein said tubular member includes:
   a mandrel member longitudinally joined at each end within said tubular member as a part of said tubular member and said mandrel member carrying said eccentric seismic member.

3. A seismic sensing system as defined in claim 1 and further comprising:
   a first centralizing member mounted upon said tubing adjacent to but longitudinally spaced from said first eccentric bearing member and having an eccentric portion operable to contact an internal wall surface of a well casing in a location diametrically opposite to the contact of the well casing by said first eccentric bearing member; and
   a second centralizing member mounted upon said tubing adjacent to but longitudinally spaced from said second eccentric bearing member and having an eccentric portion operable to contact an internal wall surface of a well casing in a location diametrically opposite to the contact of the well casing by said second eccentric bearing member.

4. A seismic sensing system as defined in claim 3 and further comprising:
   a pad mounted upon the exterior portion of each of said first and second centralizing members for cushioning the contact between said centralizing members and the interior wall surfaces of said well casing.

5. A seismic sensing system as defined in claim 1 and further comprising:
   a control cable guide mounted at each end of said eccentric seismic member for guiding and protecting a control cable extending along said tubular member.

6. A seismic sensing system as defined in claim 1 wherein:
   the opposing interference fit is within a range of approximately four to eight millimeters.

7. A seismic sensing system as defined in claim 1 wherein:
   the opposing interference fit is within a range of approximately 4.5 to 5.0 millimeters.

8. A seismic sensing system as defined in claim 1 wherein:
   the opposing interference fit is approximately eight millimeters.

9. A seismic sensing system as defined in claim 1 wherein:
   a longitudinal distance between a lateral midpoint of said eccentric seismic member and a lateral midpoint of each of the first and second eccentric bearing members is within a range of approximately 250 to 300 centimeters.

10. A monitoring well seismic sensing assembly, operable to be mounted upon a well tubing for insertion into a monitoring well, said monitoring well sensing assembly comprising:
    first and second eccentric bearing members operable to be clamped onto the well tubing, said first and second eccentric bearing member having;
       a first saddle portion operable to be positioned upon the well tubing,
       a second saddle portion operable to be positioned upon the well tubing and coupled to opposing said first saddle portion, and
       an eccentric bearing portion extending from an exterior portion of said second saddle portion and having an exterior bearing surface operable to abut against an interior surface of the monitoring well wherein a first bearing radial distance from an imaginary central longitudinal axis defined between the coupled first and second saddle portions to a maximum eccentric point on the exterior surface of said eccentric bearing portion is greater than a second bearing radial distance diametrically opposite to the first bearing radial distance and extending from the imaginary central longitudinal axis to an exterior surface of said first saddle portion;
    an eccentric seismic member operable to be clamped onto the well tubing in a position between and rotated one hundred and eighty degrees out of phase to said first and second eccentric bearing members, said eccentric seismic member having;
       a first saddle portion operable to be positioned upon the well tubing,
       a second saddle portion operable to be positioned upon the well tubing and coupled to the opposing said first saddle portion, and an eccentric seismic sensing member coupled to an exterior portion of said second saddle portion and being operable to abut against an interior surface of the monitoring well wherein a first seismic radial distance of an imaginary central longitudinal axis defined between the coupled first and second saddle portions of said eccentric seismic member to a maximum eccentric point on an eccentric contact surface of said eccentric seismic sensing member is greater than a second seismic radial distance from the imaginary central longitudinal axis to an exterior surface of said first saddle portion and wherein the first bearing radial distance plus the first seismic radial distance is greater than the diameter of a surrounding monitoring well such that an interference fit will exist to acoustically couple the eccentric seismic sensing member against an interior wall surface of the monitoring well.

11. A monitoring well seismic sensing assembly operable to be mounted upon well tubing as defined in claim 10 wherein said interference fit is within a range of approximately four to eight millimeters.

12. A monitoring well seismic sensing assembly operable to be mounted upon well tubing as defined in claim 10 wherein said interference fit is within a range of approximately 4.5 to 5.0 millimeters.

13. A monitoring well seismic sensing assembly operable to be mounted upon well tubing as defined in claim 10 wherein said interference fit is approximately eight millimeters.

14. A method for deploying a long term seismic sensing system downhole within a well comprising:
   mounting at least one seismic sensing assembly onto a tubing to be inserted into a well casing of a well including the steps of;
   mounting a first eccentric bearing member onto the tubing operable to extend down to a desired depth within the well casing;
   mounting a second eccentric bearing member onto the tubing operable to extend down to a desired depth within the well casing, said second eccentric bearing member being in azimuthal alignment with said first eccentric bearing member;
   mounting an eccentric seismic member onto the tubing between said first and second eccentric bearing members with an azimuthal orientation that is 180° out of phase with said first and second eccentric bearing members and wherein a first radial distance from a central longitudinal axis of said tubing to a maximum eccentric point of an exterior surface of said eccentric bearing members plus a second radial distance from the central longitudinal axis to a maximum eccentric point of an exterior surface of said eccentric seismic member is greater than the internal diameter of the well casing;
   inserting the tubing coupled with the first and second bearing members and the eccentric seismic member into the well casing resulting in the bending of the tubing and the application of lateral force to said eccentric seismic member bringing the eccentric seismic member into firm contact with an interior wall surface of the well casing.

15. A method for deploying a long term seismic sensing system as defined in claim 14 and further comprising:
   centering the tubing within the well casing beyond the location of said first and second eccentric bearing members.

16. A method for deploying a long term seismic sensing system as defined in claim 15 and further comprising:
   cushioning the tubing during the centering process with respect to contact with the well casing.

17. A method for deploying a long term seismic sensing system downhole as defined in claim 14 wherein the first radial distance plus the second radial distance is greater than the internal diameter of the well casing by within a range of approximately four to eight millimeters.

18. A method for deploying a long term seismic sensing system downhole as defined in claim 14 wherein the first radial distance plus the second radial distance is greater than the internal diameter of the well casing by within a range of approximately 4.5 to 5.0 millimeters.

19. A method for deploying a long term seismic sensing system downhole as defined in claim 14 wherein the first radial distance plus the second radial distance is greater than the internal diameter of the well casing by approximately eight millimeters.

20. A method for deploying a long term seismic sensing system downhole as defined in claim 14 wherein said step of mounting at least one seismic sensing assembly onto the tubing comprises mounting two or more seismic sensors.

21. A method for deploying a long term seismic sensing system downhole as defined in claim 20 wherein mounting two or more seismic sensors comprises mounting at least two of the two or more seismic sensors in azimuthal alignment upon the tubing.

22. A method for deploying a long term seismic sensing system downhole as defined in claim 14 wherein mounting at least one seismic sensing assembly comprises mounting a plurality of seismic sensing assemblies in groups of four.

* * * * *